United States Patent
Lin et al.

(10) Patent No.: US 9,594,977 B2
(45) Date of Patent: Mar. 14, 2017

(54) AUTOMATICALLY SELECTING EXAMPLE STYLIZED IMAGES FOR IMAGE STYLIZATION OPERATIONS BASED ON SEMANTIC CONTENT

(71) Applicant: Adobe Systems Incorporated, San Jose, CA (US)

(72) Inventors: Zhe Lin, Fremont, CA (US); Xiaohui Shen, San Jose, CA (US); Kalyan Sunkavalli, San Jose, CA (US); Joon-Young Lee, Daejeon (KR)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 14/735,822

(22) Filed: Jun. 10, 2015

(65) Prior Publication Data
US 2016/0364625 A1 Dec. 15, 2016

(51) Int. Cl.
*G06K 9/62* (2006.01)
*G09G 5/00* (2006.01)
(Continued)

(52) U.S. Cl.
CPC ......... *G06K 9/4652* (2013.01); *G06K 9/4661* (2013.01); *G06K 9/52* (2013.01);
(Continued)

(58) Field of Classification Search
CPC .. G06K 9/4652; G06K 9/6256; G06K 9/6267; G06K 9/6215; G06K 9/52;
(Continued)

(56) References Cited

U.S. PATENT DOCUMENTS 7,035,467 B2 * 4/2006 Nicponski ............ G06K 9/6269 382/190
7,327,891 B2 * 2/2008 Covell .............. G06F 17/30256 382/112
(Continued)

OTHER PUBLICATIONS

Xiaobo AN, et al., User-Controllable Color Transfer, Computer Graphics Forum, vol. 29, Issue 2, May 2010, 9 pages.
(Continued)

*Primary Examiner* — Sheela C Chawan
(74) *Attorney, Agent, or Firm* — Kilpatrick Townsend & Stockton LLP (57) ABSTRACT

Systems and methods are provided for content-based selection of style examples used in image stylization operations. For example, training images can be used to identify example stylized images that will generate high-quality stylized images when stylizing input images having certain types of semantic content. In one example, a processing device determines which example stylized images are more suitable for use with certain types of semantic content represented by training images. In response to receiving or otherwise accessing an input image, the processing device analyzes the semantic content of the input image, matches the input image to at least one training image with similar semantic content, and selects at least one example stylized image that has been previously matched to one or more training images having that type of semantic content. The processing device modifies color or contrast information for the input image using the selected example stylized image.

20 Claims, 7 Drawing Sheets
(4 of 7 Drawing Sheet(s) Filed in Color)

(51) Int. Cl.
*G06K 9/46* (2006.01)
*G06T 7/40* (2006.01)
*G06K 9/52* (2006.01)
*G06T 7/60* (2006.01)

(52) U.S. Cl.
CPC ......... *G06K 9/6215* (2013.01); *G06K 9/6218* (2013.01); *G06K 9/6256* (2013.01); *G06K 9/6267* (2013.01); *G06T 7/408* (2013.01); *G06T 7/60* (2013.01)

(58) Field of Classification Search
CPC .... G06K 9/4661; G06K 9/6218; G06T 7/408; G06T 7/60
USPC ....... 382/159, 181, 190, 195, 199, 254, 266, 382/260, 276, 284, 224; 345/418, 581, 345/582, 156, 173
See application file for complete search history.

(56) References Cited

U.S. PATENT DOCUMENTS

| | | | |
|---|---|---|---|
| 7,783,135 B2 * | 8/2010 | Gokturk | G06F 17/30253 382/209 |
| 8,111,923 B2 * | 2/2012 | Csurka | G06K 9/00624 382/170 |
| 8,139,900 B2 * | 3/2012 | Gokturk | G06F 17/30253 382/278 |
| 8,594,430 B2 * | 11/2013 | Cristinacce | G06K 9/00281 382/118 |
| 9,020,263 B2 * | 4/2015 | Dunlop | G06K 9/00684 382/173 |
| 9,111,146 B2 * | 8/2015 | Dunlop | G06K 9/00718 |
| 2010/0226582 A1 * | 9/2010 | Luo | G06F 17/30265 382/224 |

OTHER PUBLICATIONS

Aubry, M., et al., Fast Local Laplacian Filters: Theory and Applications, ACM Transaction Graphics, vol. 33, Issue 5, Sep. 2014, Article No. 167, 15 pages.
Bae, Soonmin, et al., Two-Scale Tone Management for Photographic Look, ACM Transaction Graphics, vol. 25, Issue 3, Jul. 2006, pp. 637-645.
Bonneel, Nicholas, Example-Based Video Color Grading, ACM Transaction Graphics, vol. 32, Issue 4, Jul. 2013, Article 39, 11 pages.
Bychkovsky, Vladimir, et al., 2011.Learning Photographic Global Tonal Adjustment With a Database of Input/Output Image Pairs, IEEE Computer Vision and Pattern Recognition, Jun. 2011, pp. 97-104.
Caicedo, Juan, et al., Collaborative personalization of image enhancement, IEEE Computer Vision and Pattern Recognition, Jun. 2011, pp. 249-256.
Dale, Kevin, et al., Image Restoration Using Online Photo Collections, IEEE Computer Vision, Sep.-Oct. 2009, pp. 2217-2224.
Dowson, D.C., et al., The Fréchet Distance Between Multivariate Normal Distributions, Journal of Multivariate Analysis, vol. 12, Issue 3, 1982, pp. 450-455.
Faridul, H. S., et al., A Survey of Color Mapping and Its Applications, Eurographics, 2014, pp. 43-67.
Hacohen, Yoav, et al., Non-Rigid Dense Correspondence With Applications for Image Enhancement, ACM Transaction Graphics, vol. 30, Article 70, Issue 4, Jul. 2011, 9 pages.
Hwang, Sung Ju., et al., Context-Based Automatic Local Image Enhancement, Computer Vision—ECCV, vol. 7572, 2012, pp. 569-582.
Hwang, Youngbae, et al., Color Transfer Using Probabilistic Moving Least Squares, Computer Vision and Pattern Recognition, IEEE, Jun. 2014, 8 pages.
Jia, Yangqing, et al., Caffe: An Open Source Convolutional Architecture for Fast Feature Embedding, http://caffe.berkeleyvision.org/, 2014, 4 pages.
Johnson, M.K. et al., Cg2real: Improving the Realism of Computer Generated Images Using a Large Collection of Photographs, IEEE Trans, Visualization and Computer Graphics vol. 17, Issue 9, Sep. 2011, 13 pages.
Kang, Sing Bang, et al., Personalization of Image Enhancement, IEEE Computer Vision Pattern Recognition, Jun. 13-18, 2010, 8 pages.
Krizhevsky, Alex., 2012. Imagenet Classification With Deep Convolutional Neural Networks, NIPS, 2012, 9 pages.
Lazebnik, Svetlana, et al., Beyond Bags of Features: Spatial Pyramid Matching for Recognizing Natural Scene Categories, 2006, IEEE Computer Vision and Pattern Recognition, pp. 1-8.
Liu, Yiming, et al., Autostyle: Automatic Style Transfer From Image Collections to Users Images, Computer Graphics Forum, vol. 33, Issue 4, Jul. 2014, 11 pages.
Pitié, F, et al., The Linear Monge Kantorovitch Linear Colour Mapping for Example-Based Colour Transfer, Conference Visual Media Production, Nov. 2007, 9 pages.
Pouli, Tania, et al, Progressive Color Transfer for Images of Arbitrary Dynamic Range, Computers & Graphics vol. 35, Issue 1, Feb. 2011, 33 pages.
Reinhard, Erik, Color Transfer Between Images, IEEE Computer Graphics and Applications, vol. 21, Issue 5, Sep.-Oct. 2001, pp. 34-41.
Shih, Yichang, et al., Style Transfer for Headshot Portraits, ACM Transactions Graphics vol. 33, Issue 4, Article 148, Jul. 2014, 14 pages.
Tai, Yu-Wing, et al., Soft Color Segmentation and Its Applications, IEEE Trans Pattern Analysis and Machine Intelligence, vol. 29, Issue 9, Sep. 2007, pp. 1520-1537.
Wang, Baoyuan, et al., Example-Based Image Color and Tone Style Enhancement, ACM Transactions on Graphics, vol. 30, Issue 4, Article 64, Jul. 2011, 11 pages.
Xue, Su, Understanding and Improving the Realism of Image Composites, ACM Transaction on Graphics, vol. 31, Issue 4, Article 84, Jul. 2012, 10 pages.
Yan, Jianzhou, et al., A Learning To-Rank Approach for Image Color Enhancement, Computer Vision and Pattern Recognition IEEE, Jun. 2014, 8 pages.
Yan, Zhicheng, et al., Automatic Photo Adjustment Using Deep Learning, ACM Transacrtions on Graphics, arXiv:1412.7225v1, 2014, 15 pages.
Pitie, F., et al., N-Dimensional Probability Density Function Transfer and Its Application to Color Transfer, IEEE International Conference on Computer Vision, vol. 2, 2005, 6 pages.
Yuan, L., et al., Automatic Exposure Correction of Consumer Photographs, Computer Vision—ECCV, 2012., 14 pages.

* cited by examiner

AUTOMATICALLY SELECTING EXAMPLE STYLIZED IMAGES FOR IMAGE STYLIZATION OPERATIONS BASED ON SEMANTIC CONTENT

TECHNICAL FIELD

This disclosure relates generally to computer-implemented methods and systems and more particularly relates to automatically selecting example stylized images for image stylization operations based on the semantic content of an input image.

BACKGROUND

Artists often edit the color, contrast, and tonal distributions of images for stylistic reasons. These edits can be performed by manually modifying properties such as color hue, tint, saturation, and contrast using image manipulation applications. One way of altering the appearance of an image to achieve a desired change to the image involves applying a style. Applying a "style" refers to applying one or more color-changing or contrast-changing filters or other operations to the image.

Figure 1:
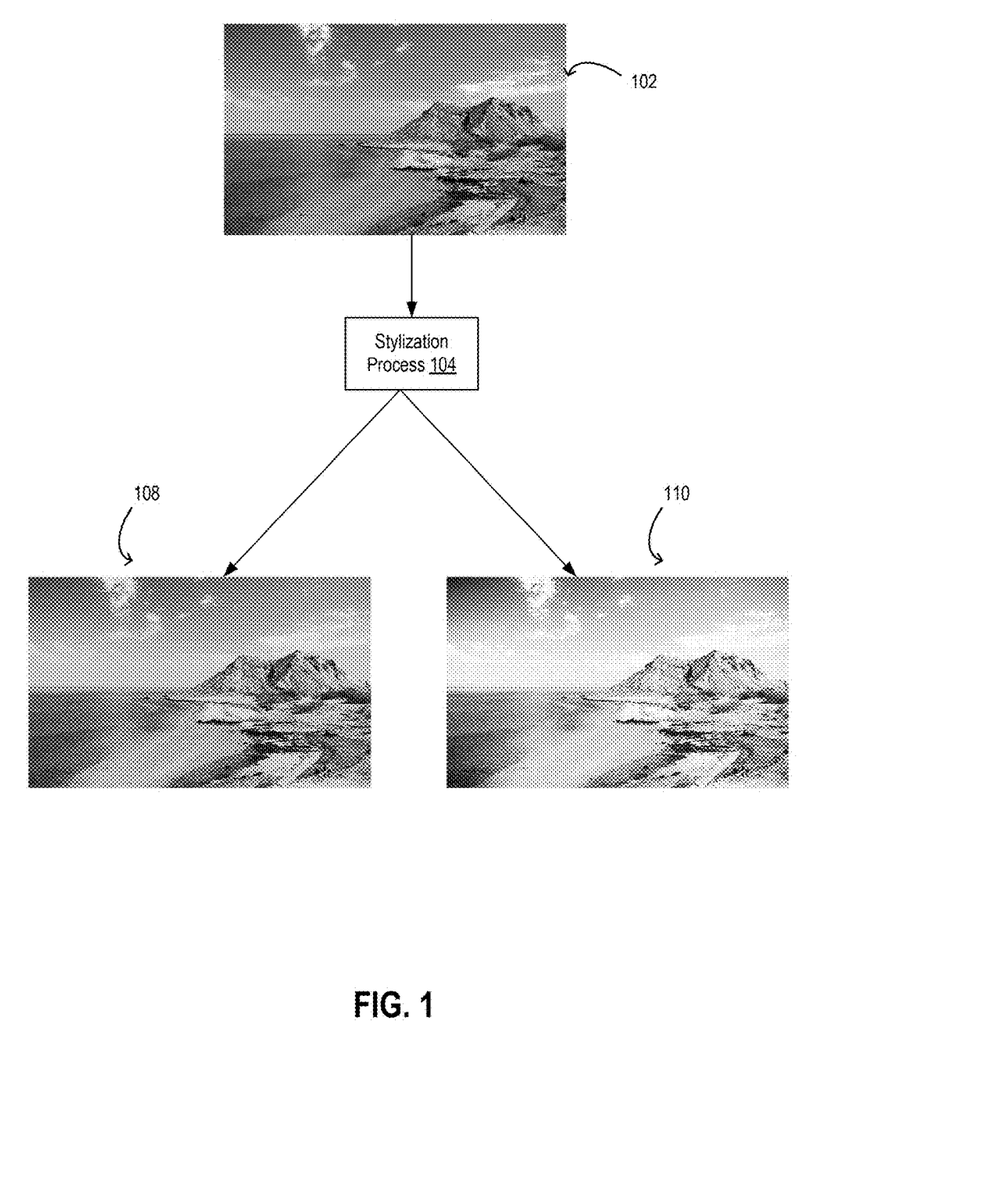
FIG. 1 is a block diagram depicting an example of modifying style characteristics of an image.

For example, FIG. 1 is a block diagram depicting an example of modifying color schemes or other style characteristics of an image 102. An image manipulation application performs one or more stylization processes 104 that globally or locally transform color information and contrast information of the image 102. In one example, the image 102 is transformed into the image 108 by applying a stylization process 104 that decreases the contrast between objects in the image 102 and de-saturates the colors in the image 102. In another example, the image 102 is transformed into the image 110 by applying a stylization process 104 that increases the brightness of the image 102.

There are two popular approaches for selecting a style to apply to an image. The first approach involves using a set of pre-crafted filters, such as the fixed filter options provided by traditional image editing applications. This approach is undesirable, however, because the limited set of filters only presents a few options, and thus will not provide an appropriate style for many input images.

The second approach involves example-based techniques that use example stylized images to identify a style that is to be applied to an image. In these example-based techniques, the color and contrast of a given example stylized image is used to alter the input image. For example, color schemes or other style characteristics may be modified in the input image to match the color scheme or other style characteristics of an example stylized image. Using example stylized images can allow users to intuitively identify color schemes, contrast schemes, or style characteristic of interest that are to be applied to an input image. The quality of a stylized output image can depend on the selection of an appropriate example stylized image. For example, using an outdoor landscape image to stylize an indoor portrait may cause unnatural color shifts in the input image, resulting in a low quality output image.

The choice of the example stylized image is critical. Attempting to transfer color or contrast information from certain example stylized images to an input image can lead to distortion or other undesirable results of the input images.

Prior solutions for selecting example stylized images may present disadvantages. For example, some solutions involve using curated sets of example stylized images. A curated set of example stylized images includes images that are manually reviewed to ensure that they have sufficiently high quality for use in a stylization process. However, a curated set of example stylized images may not include images having different types of content for the same type of image style. Thus, if a semantic similarity metric is used to find an example stylized image that is most similar to an input image, the stylization process may not provide a high-quality output image. It may also be burdensome and infeasible to manually find example stylized images that can be used with an input image in example-based stylization techniques without distorting the resulting output image.

Other solutions involve using a large collection of images with different examples of semantic content to identify a sample image having a higher degree of semantic similarity to an input image as compared to images available in a smaller set of curated example stylized images. However, a large, un-curated collection of images may include images with varying levels of quality. Performing a stylization process using low-quality images may lead to poor output images. For example, the output images may include large numbers of artifacts or other distortions. Furthermore, manually curating larger sets of images to generate a semantically diverse set of high-quality example stylized images may be infeasible.

It is desirable to select high-quality example stylized images for stylization operations that are suitable for stylizing input images having a wide variety of semantic content.

SUMMARY

According to certain embodiments, systems and methods are provided for automatically selecting example stylized images used in image stylization operations based on the semantic content of an input image. In some embodiments, an example stylized image is a sample image whose color or contrast information is used by a stylization process as an example when modifying the color or contrast information for an input image (e.g., by transferring one or more of color information and contrast information from the example stylized image to the input image). Training images can be used to identify example stylized images that will generate high-quality stylized images when stylizing input images having certain types of semantic content. In one example, a processing device determines which example stylized images are more suitable for use with certain types of semantic content represented by training images. When the processing device receives an input image, the processing device analyzes the semantic content of the input image, matches the input image to at least one training image with similar semantic content, and selects at least one example stylized image that has been previously matched to one or more training images having that type of semantic content. The processing device modifies color or contrast information for the input image using the selected example stylized image.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

The patent or application file contains at least one drawing executed in color. Copies of this patent or patent application publication with color drawing(s) will be provided by the Office upon request and payment of the necessary fee.

Features, embodiments, and advantages of the present disclosure are better understood when the following Detailed Description is read with reference to the accompanying drawings, where.

DETAILED DESCRIPTION

Computer-implemented systems and methods are disclosed for automatically identifying example stylized images suitable for an input image using the input image's semantic content (e.g., objects and their arrangement as depicted in the input image). Selecting example stylized images based on semantic content similarity enables an image manipulation application to find more appropriate example stylized images for the input image than would otherwise be identified by the image manipulation application. Finding example stylized images with semantic content that is directly similar to any input image, however, may require searching a very large database of example stylized images. Creating such a large database of high-quality example stylized images is burdensome, problematic, and otherwise infeasible.

The invention provides a style selection technique that does not require a large database of high-quality example stylized images. The invention instead uses a large database of training images to link an input image to an appropriate high-quality example stylized image in a relatively smaller database of example stylized images. An input image is determined to be similar to one of those other training images based on a semantic similarity determination and, because the training image is associated with an appropriate example stylized image based on a style similarity determination, an appropriate example stylized image is identified. The training images do not need to be high-quality example stylized images. As a result, a large database of training images can be created with less effort than creating a large database of example stylized images, while still providing a wide variety of semantic content that can be used.

Accordingly, one embodiment involves receiving an input image and identifying images in the training image database having semantically similar content. For example, an input image of a tree may be matched with training images of tree based on the training images depicting trees. The identified training images are then used to identify appropriate example stylized images for the input image. For example, the images of trees from the training image database may be associated with an example stylized image of a lawn based on a style similarity determination being used to identify similarities of color and contrast between the training images of trees and the example stylized image of a lawn. In this way, an appropriate example stylized image is identified even if the semantic content of the input image (i.e., trees) does not directly match the semantic content of the example stylized image (i.e., a lawn). In addition, the large database of training images, which is used to identify which example stylized images are more suitable for certain types of semantic content, can be of poorer quality than the example stylized images, since the training images are not used as examples in example-based stylization techniques. The larger database of training images can therefore be compiled with less effort than manually assembling a large database of high-quality stylized image examples.

In some embodiments, associations between training images and stylized image examples can be pre-computed using clusters of semantically similar training images. A cluster of training images includes a subset of training images from the training image database, where the subset of training images have similar semantic content. For each cluster, available example stylized images are ranked. The rank of a given example stylized image is based on stylistic similarity (e.g., similarity in color or contrast information) between the stylized example image and the training images in the cluster. When an input image is received, the semantic content of the input image is compared with the semantic content included in each cluster to select a cluster that is semantically similar to the input image. An example stylized image having a higher rank for the selected cluster is selected. To generate a stylized output image, the input image's color information, contrast information, or other style characteristics are modified to be similar to the selected example stylized image's color information, contrast information, or other style characteristics.

As used herein, the term "example stylized image" is used to refer to an image whose image style is used to modify another image in an image stylization operation.

As used herein, the term "image stylization operation" is used to refer to any operation that modifies color information, contrast information, or other style characteristics from an example stylized image to modify color information, contrast information, or other style characteristics in another image. For example, a style transfer operation other image stylization operation may modify color information, contrast information, or both in an input image based on the color and contrast information in an example stylized image.

As used herein, the term "stylistic similarity" is used to refer to a similarity between a first image style in a first image and a second image style in a second image. For example, vectors representing color or contrast information can be calculated for two images. The stylistic similarity can be determined by calculating a distance between these vectors. A larger calculated distance indicates a lower degree of stylistic similarity, and a smaller calculated distance indicates a higher degree of stylistic similarity.

As used herein, the term "semantic similarity" is used to refer to a similarity between a first set of shapes and spatial relationships in a first image and a second set of shapes and spatial relationships in a second image. In one example, an image of a person's face has a higher semantic similarity to an image of another person and a lower semantic similarity to an image of a building. In another example, an image of two people standing close together has a higher semantic similarity to an image of a crowd of people and a lower semantic similarity to an image of a single person.

As used herein, the term "image style" is used to refer to image statistics for one or more attributes such as color information, contrast information, and other quantifiable attributes of an image. Examples of color information include a global distribution of colors within an image, local color distributions at certain portions of an image, etc. Examples of contrast information local contrast, lighting direction, vignetting (e.g., attenuation of light at a periphery of an image), etc.

Figure 2:
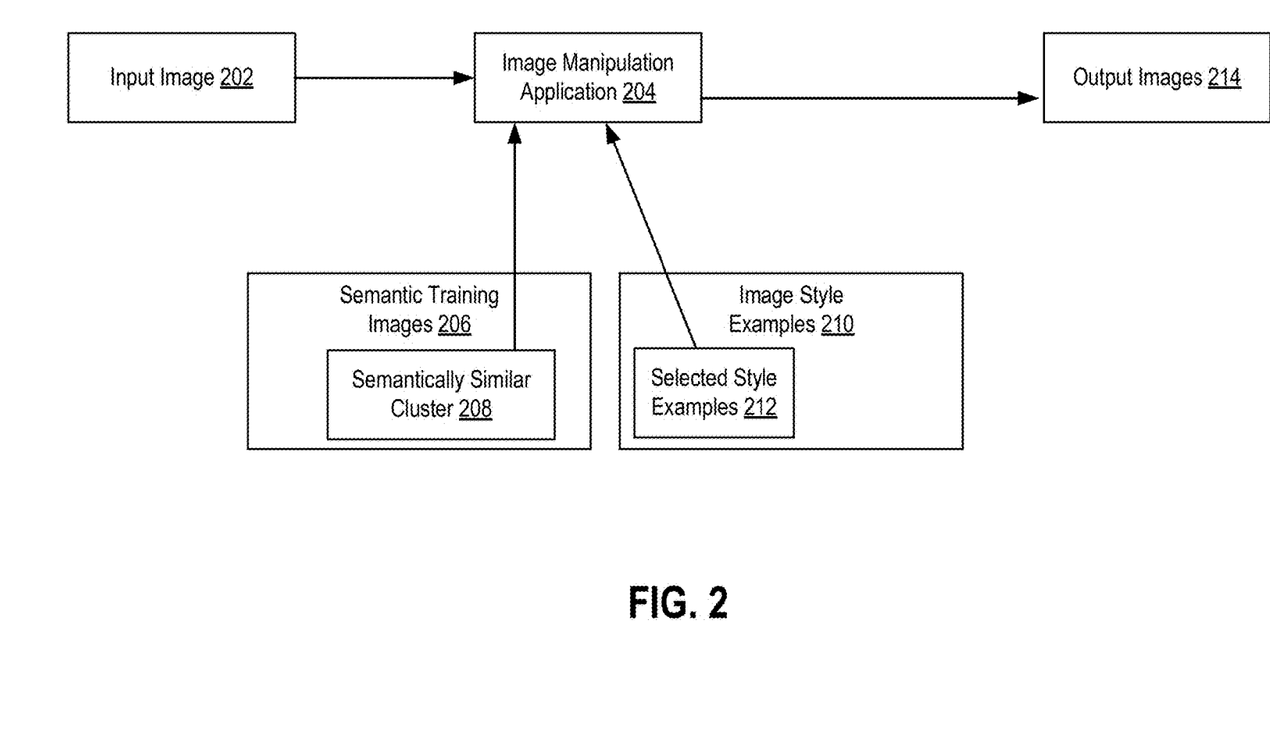
FIG. 2 is a diagram depicting a process flow in which an image manipulation application uses semantic training images and associated example stylized images to generate one or more stylized output images according to certain exemplary embodiments.

Referring now to the drawings, FIG. 2 is a diagram depicting an example of process flow in which an image manipulation application 204 uses semantic training images 206 and associated example stylized images 212 to generate one or more stylized output images 214.

The image manipulation application 204 includes program code executable by a processing device to perform one or more operations described herein. In some embodiments, the image manipulation application 204 is a stand-alone application. In other embodiments, the image manipulation application 204 includes one or more modules incorporated into another application. The image manipulation application 204 may be executed at one or more computing devices, which may be stand-alone computing devices, a set of computing devices configured for cloud computing or other distributed computing, or some combination thereof. (An example of a computing system that can execute the image manipulation application 204 is described herein with respect to FIG. 7.) In some embodiments, one or more of the input image 202, the semantic training images 206, and the example stylized images 210 are stored on a computing device that executes the image manipulation application 204. In additional or alternative embodiments, one or more of the input image 202, the semantic training images 206, and the example stylized images 210 are accessed via a network by a computing device that executes the image manipulation application 204.

In some embodiments, the semantic training images 206 are included in a set of images that is used by the image manipulation application 204 to determine the suitability of certain example stylized images 210 for certain content classes. The number of semantic training images 206 may be much larger and include a wider diversity of semantic content than the example stylized images 210. For example, the semantic training images 206 may be a large collection of images (e.g., 1 million images) that are downloaded or otherwise accessed from a publicly available source, and the example stylized images 210 may be a smaller, manually curated set of high-quality images (e.g., 1,500 images).

In some embodiments, the example stylized images 210 are include in a set of images that is used by the image manipulation application 204 to enhance or otherwise modify style attributes of the input image 202. For example, the example stylized images 210 may be manually or automatically reviewed, analyzed, or otherwise selected by a curating process that is used to identify images suitable for a stylization process (e.g., a style transfer process). The stylization process involves identifying image statistics describing measurable quantities included in the image content of a given example stylized image 210. Examples of these quantities include (but are not limited to) a global color scheme or distribution, a global tone, a local color scheme or distribution at one or more portions of an image, a local tone at one or more portions of an image, vignetting (e.g., attenuation of light at a periphery of an image), etc. The stylization process applies the identified image statistics to an input image 202 to generate a stylized output image 214. For example, the image manipulation application 204 may modify color information in an input image 202 (or a copy of the input image 202) to generate an output image 214 having a color scheme that is similar to the color scheme of an example stylized image 210.

The image manipulation application 204 uses one or more subsets of the semantic training images 206 to identify one or more of the example stylized images 210 that are suitable for performing a stylization process using the input image 202. The image manipulation application 204 performs semantic clustering operations on the semantic training images 206 to define one or more content classes (e.g., buildings, landscapes, head shots, etc.) to which the image content of a given input image 202 may belong. The image manipulation application 204 also performs style ranking operations on the example stylized images 210 to determine which of the example stylized images 210 may be more suitable for use with a given class of content. In some embodiments, the clustering and ranking operations are performed prior to receiving an input image 202.

The image manipulation application 204 clusters the semantic training images 206 based on one or more semantic features. Each cluster of the semantic training images 206 includes a respective subset of the semantic training images 206 having a semantic similarity above a threshold similarity. For example, one cluster may include multiple images of different faces, another cluster may include multiple images of different buildings, etc. Each cluster can define a content class (e.g., image content with faces, image content with buildings, etc.).

The image manipulation application 204 ranks the set of example stylized images 210 for each cluster based on a stylistic similarity between a given example stylized image and a given cluster. For example, the image manipulation application 204 can compute a stylistic similarity metric identifying a degree of stylistic similarity between each semantic training image in a cluster and a given example stylized image. The image manipulation application 204 aggregates or otherwise combines the computed stylistic similarity metrics to generate a combined metric. The combined metric indicates a degree of stylistic similarity between the example stylized image and the cluster (and its associated content class). The image manipulation application 204 stores the combined metrics for respective example stylized images in a database or other suitable data structure. The combined metrics allow the image manipulation application 204 to identify which example stylized images are more suitable for a given content class based on the example stylized images having higher stylistic similarity metrics with respect to a cluster representing the content class.

In some embodiments, style rankings or the selection of certain style examples may be customized or otherwise adapted based on user preferences or user inputs received by the image manipulation application 204. In one example, a given example stylized image may be selected or ranked based on one or more prior user inputs indicating a preference for the example stylized image. In another example, the ranking of an example stylized image with respect to a cluster may be decreased if one or more prior user inputs indicate a rejection of the example stylized image. In another example, an example stylized image may be excluded from a set of rankings for a cluster, even if the example stylized image is stylistically similar to the cluster, if one or more prior user inputs indicate a rejection of the example stylized image.

For example, over a period of time, the image manipulation application 204 may store information indicating which style examples have been selected or rejected by a given user. The image manipulation application 204 can determine from the stored information that the user has selected or rejected particular example stylized images more frequently or less frequently. A given example stylized image may be moved up or down in a ranking (or excluded altogether from the ranking) based on the frequency with which the user has historically selected or rejected the style example.

When the image manipulation application 204 receives an input image 202, the image manipulation application 204 determines that the input image 202 corresponds to one or more semantically similar clusters 208 from the semantic training images 206. A semantically similar cluster 208 can be a subset of the semantic training images 206 having a semantic similarity to the input image 202 that is greater than a threshold similarity. The image manipulation application 204 identifies one or more selected style examples 212 based on the semantically similar cluster 208.

A selected style example 212 is stylistically similar to the semantically similar cluster 208. In some embodiments, the image manipulation application 204 determines this stylistic similarity based on the rank associated with the selected style example 212 with respect to the semantically similar cluster 208. (In some embodiments, the image manipulation application 204 performs one or more operations to ensure that selected style examples 212 are stylistically distinct from one another, as described in further detail herein.) The image manipulation application 204 applies a style transfer algorithm or other stylization process by using the selected style example 212 to generate one or more stylized output images 212 from the input image 202.

Figure 3:
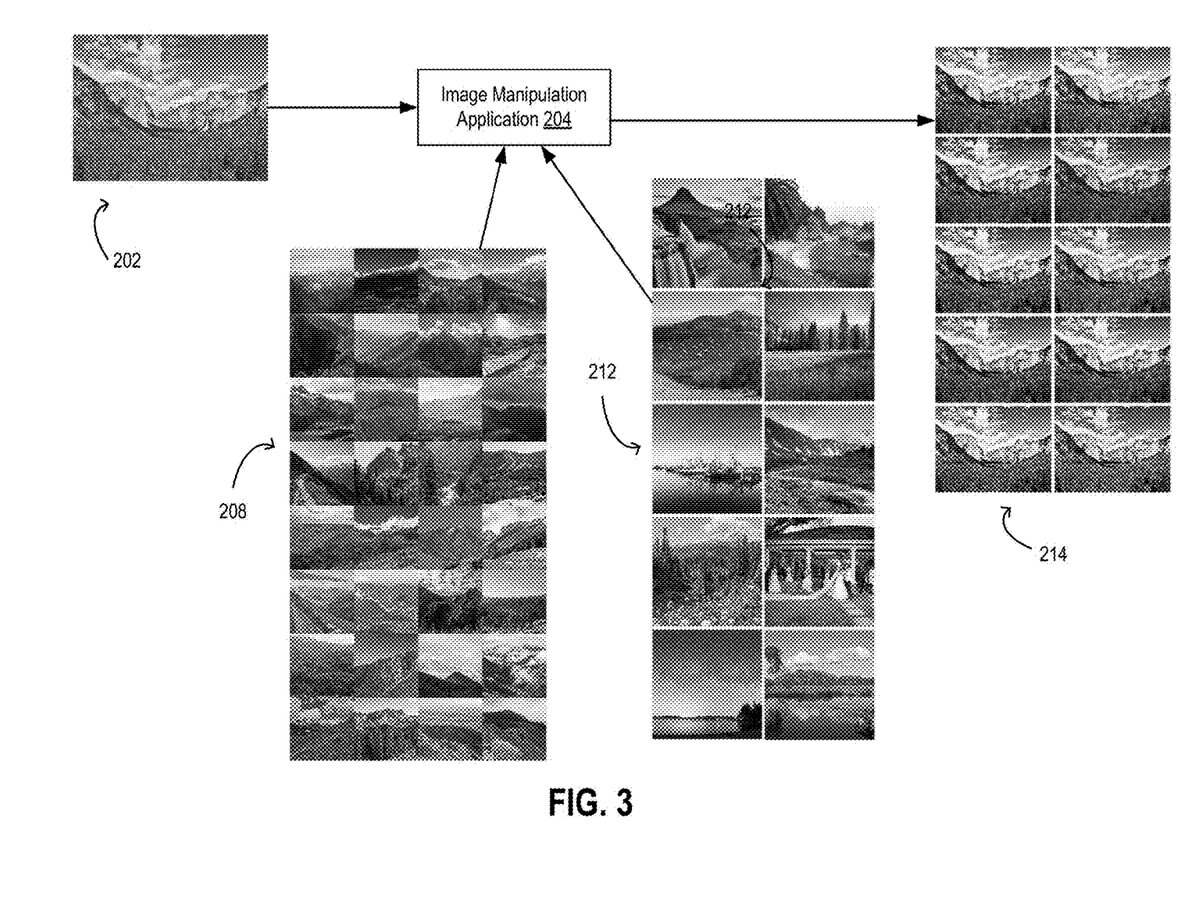
FIG. 3 depicts examples of an input image, semantic training images, associated example stylized images, and resulting stylized output images for the process flow depicted in FIG. 2 according to certain exemplary embodiments.

FIG. 3 is a diagram depicting examples of semantic training images and associated style examples that are used to generate stylized output images from an input image. An input image 202 depicts a landscape. A semantically similar cluster 208 includes other images of landscapes. A set of selected example stylized images 212 includes various images that may or may not depict landscapes, but have a sufficiently high degree of stylistic similarity to the content class represented by the cluster 208. The image manipulation application 204 applies at least some of the styles from the set of selected example stylized images 212 to generate a set of stylized output images 214 depicting the same landscape as the image 202, but with different style schemes applied (e.g., different colorizations, different contrasts, etc.).

Figure 4:
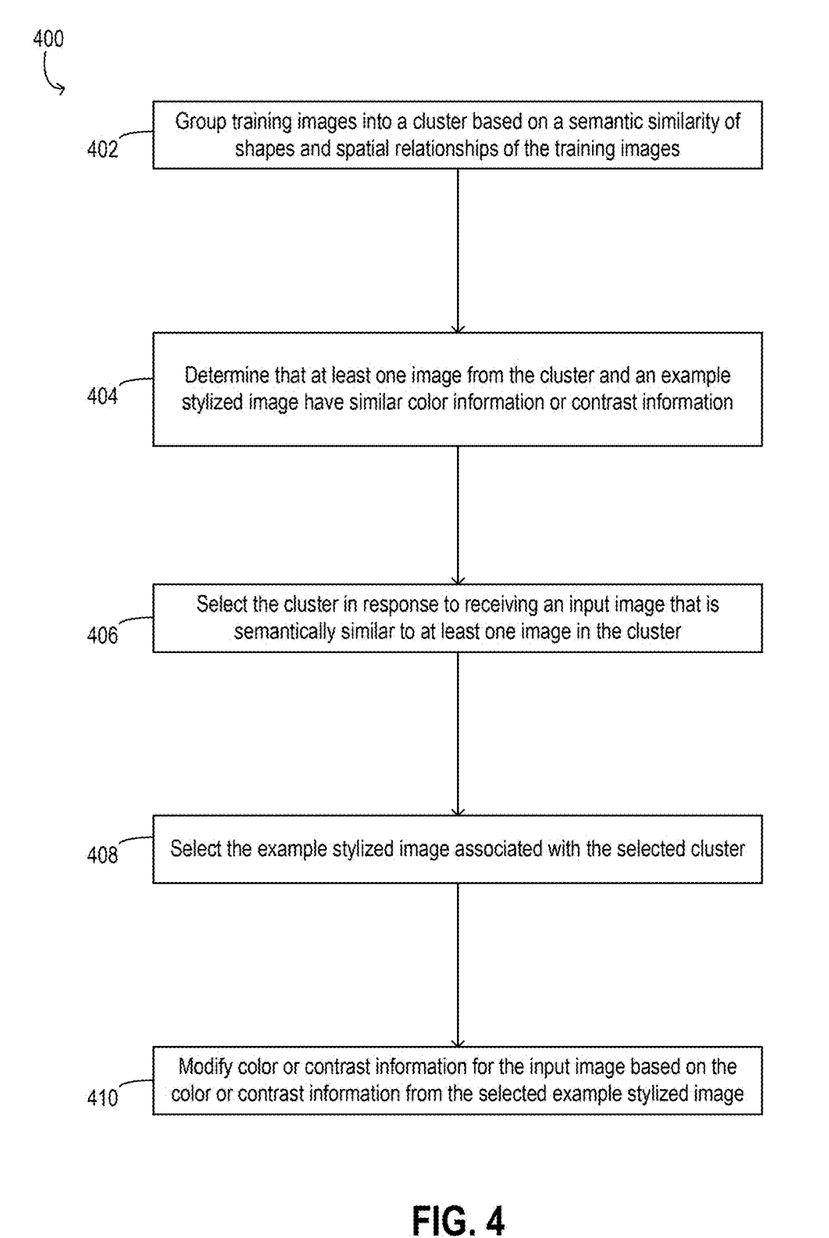
FIG. 4 is a flow chart depicting an example of a process for automatically selecting example stylized images for image stylization operations based on the semantic content of an input image according to certain exemplary embodiments.

FIG. 4 is a flow chart depicting an example of a process 400 for automatically selecting style examples for image stylization operations based on the semantic content of an input image according to certain exemplary embodiments. For illustrative purposes, the process 400 is described with reference to the implementation depicted in FIGS. 2-4. Other implementations, however, are possible.

The process 400 involves grouping training images into one or more clusters based on a semantic similarity of shapes and spatial relationships of the training images, as depicted in block 402. For example, the image manipulation application 204 may be executed by a suitable processing device to access images to be used as semantic training images 206. The images may be accessed from a database or other suitable data structure that is stored on a non-transitory computer-readable medium accessible to the image manipulation application 204. The image manipulation application 204 groups the semantic training images 206 into clusters. Each cluster includes a respective subset of images from the semantic training images 206 having a semantic similarity above a threshold similarity. The semantic similarity can include, for example, a similarity between different sets of shapes and spatial relationships in different images. Since each cluster includes similar semantic content, each cluster can represent a content class that includes a certain type of semantic content.

In some embodiments, grouping image examples into clusters based on their semantic similarities involves using convolutional neural networks for image classification and semantic feature learning. For example, the image manipulation application 204 may use any suitable convolutional neural network (e.g., a neural network using the Caffe framework) to identify clusters of semantically similar images. The image manipulation application 204 extracts a 4096-dimensional feature vector at the second fully connected layer of the neural network to identify semantically similar clusters of images. The image manipulation application 204 performs k-means clustering on the feature vector for each of the semantic training images 206 to obtain semantically similar clusters of images.

The example involving convolutional neural networks is provided for illustrative purposes only. The image manipulation application 204 may use any suitable algorithm to identify and compare semantic features in different images.

The image manipulation application 204 can use any suitable number of clusters. Each cluster can represent a given content class (e.g., types of content or collections of content in an image). A suitable number of clusters can allow for both a wide range of discrimination between input images (e.g., matching different input images to different clusters representing difference content classes) and generalization (e.g., allowing images with minor differences in features to be assigned to the same content class). For example, a smaller number of clusters may result in different content classes being included in the same cluster, thereby reducing the discriminability of the semantic features. A larger number of clusters may cause two different input images of the same content class to be matched to different clusters due to small differences in low-level semantic features. In one example, using 1000 clusters may provide a sufficient balance of discrimination and generalization.

Figure 5:
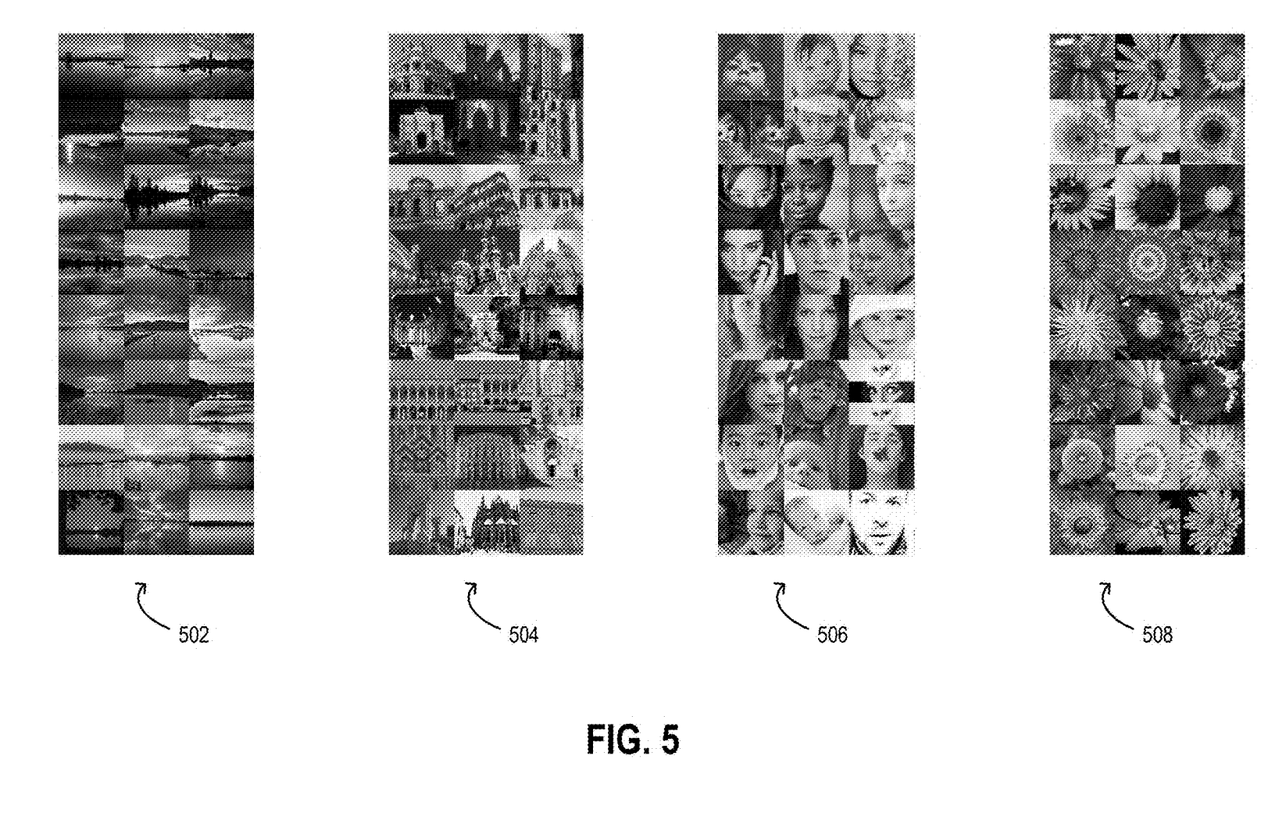
FIG. 5 depicts examples of semantically similar clusters of images that are identified using the process depicted in FIG. 4.

FIG. 5 depicts examples of semantically similar clusters of images that are identified using the process 400. For example, cluster 502 includes landscapes, cluster 504 includes buildings, cluster 506 includes faces, and cluster 508 includes flowers. The example images in a given cluster share semantically similar content, but may have diverse appearances (e.g., differences in style). These intra-class variations in appearance allow the image manipulation application 204 to determine which image styles may be more or less relevant to a given content class.

Returning to FIG. 4, the process 400 also involves determining that at least one image from the cluster and an example stylized image have similar color information or contrast information, as depicted in block 404. For example, the image manipulation application 204 may be executed by a suitable processing device to access images to be used as example stylized images 210. The example stylized images 210 may be accessed from a database or other suitable data structure that is stored on a non-transitory computer-readable medium accessible to the image manipulation application 204. A stylistic similarity (e.g., a similarity in one or more of color information and contrast information) between a given image style and the cluster can indicate that the example stylized image is suitable stylizing images having semantic content that is similar to the semantic content in cluster. In some embodiments, for each cluster, the image ranks the example stylized images 210 according to the stylistic similarity between each example stylized image 210 and the cluster. An image style can include, for example, respective image statistics for at least one of color information and contrast information.

In some embodiments, ranking a given example stylized image involves computing a stylistic similarity metric indicating a degree of stylistic similarity between the example stylized image and each of the semantic training images in a given cluster. In one example, an image style can be represented using chrominance and luminance statistics of each image under consideration. The image manipulation application 204 computes a stylistic similarity metric $\mathcal{R}$ between an image P (e.g., one of the semantic training images in a cluster) and an image Q (e.g., one of the example stylized images). In an example involving the CIELab color space, the stylistic similarity metric $\mathcal{R}$ is computed using multivariate Gaussian statistics of the chrominance channel (a* and b*) for each image and the percentiles of the cumulative distribution function of the luminance channel (L*).

In an example involving the CIELab color space, the following formula can be used to compute a stylistic similarity metric:

$$\mathcal{R}(P, Q) = \exp\left(-\frac{\mathcal{D}_e(\mathcal{L}_P, \mathcal{L}_Q)^2}{\lambda_l}\right) \exp\left(-\frac{\mathcal{D}_h(\mathcal{N}_P, \mathcal{N}_Q)^2}{\lambda_C}\right).$$

$\mathcal{L}_P$ represents the luminance histogram with uniformly sampled percentiles of the luminance cumulative distribution function for the image P. $\mathcal{L}_Q$ represents the luminance histogram with uniformly sampled percentiles of the luminance cumulative distribution function for the image Q. $\mathcal{D}_e$ represents the Euclidean distance between the luminance features of the two images. $\lambda_l$ and $\lambda_C$ represent normalization parameters. $\mathcal{N}_P$ represents the Gaussian statistics ($\mathcal{N}_P = (\mu_P, \Sigma_P)$) of the image P, and $\mathcal{N}_Q$ represents the Gaussian statistics ($\mathcal{N}_Q = (\mu_Q, \Sigma_Q)$) of the image Q. $\mu_P$ and $\mu_Q$ represent the means of the chrominance channel distribution functions for the images P and Q. $\Sigma_P$ and $\Sigma_Q$ represent the covariance matrices of the chrominance channel distribution functions for the image P and Q. $\mathcal{D}_h$ represents the Hellinger distance between the Gaussian statistics. $\mathcal{D}_h$ is calculated using the formula:

$$\mathcal{D}_h(\mathcal{N}_P, \mathcal{N}_Q) = 1 - \frac{|\Sigma_P|^{1/4}|\Sigma_Q|^{1/4}}{|\Sigma|^{1/2}} \exp\left(-\frac{1}{8}(\mu_P - \mu_Q)^T \Sigma^{-1}(\mu_P - \mu_Q)\right)$$

$$\text{s.t. } 1 - \frac{\Sigma_P + \Sigma_Q}{2}.$$

The Hellinger distance measures the overlap between two distributions. Large differences in covariance characteristics are strongly penalized even if the means of two distributions are close enough. Low-quality images from a cluster may be non-colorful or grayish, leading to small covariance values. Using the Hellinger distance may reduce the effect of these low-quality images in determining an overall degree of similarity between the cluster and a given example stylized image.

In this example, the image manipulation application 204 aggregates stylistic similarity metrics $\mathcal{R}$ that are calculated between a given example stylized image and each semantic training image in a cluster. The aggregation is performed using the formula:

$$\bar{\mathcal{R}}_k(S) = \sum_{P \in C_K} \mathcal{R}(S, P).$$

S represents the given example stylized image. $P \in C_K$ represents the semantic training images in the cluster $C_K$. The ranking $\bar{\mathcal{R}}$ is computed for each example stylized image. The ranking of different example stylized images involves sorting values of $\bar{\mathcal{R}}$ in decreasing order.

The example involving the CIELab color space is provided for illustrative purposes. The image manipulation application 204 may use any suitable algorithm for determining degrees of stylistic similarity between different images.

In some embodiments, a discriminative classifier training algorithm is used for determining degrees of stylistic similarity between different images. For example, in a binary discriminative classifier algorithm, a style descriptor can be used as a feature and a multi-class classifier can be trained to assign a style example to a given cluster of k clusters (e.g. 1000 clusters) using the feature. The training can be performed using support vector machine classifier training or any other suitable machine learning tools.

In additional or alternative embodiments, a density-based algorithm is used for determining degrees of stylistic similarity between different images. For example, this algorithm may estimate or otherwise determine a probability distribution for a style descriptor with respect to each cluster. This estimation can be performed using a Gaussian mixture model or a kernel density estimation. For each style example, the algorithm can use a probability from the probability distribution as a measure of stylistic similarity between the style example and the cluster. The measure of stylistic similarity is used for ranking the style example with respect to the cluster.

The process 400 also involves selecting a semantically similar cluster 208 in response to receiving an input image 202 that is semantically similar to one or more of the images in the cluster 208, as depicted in block 406. For example, the image manipulation application 204 may be executed by a suitable processing device to receive or otherwise access the input image 202. The input image 202 may be accessed from a database or other suitable data structure that is stored on a non-transitory computer-readable medium accessible to the image manipulation application 204. The image manipulation application 204 determines a semantic similarity between the input image 202 and one or more of the clusters of semantic training images 206. If the determined semantic similarity is above a threshold similarity, the image manipulation application 204 selects the cluster for use in identifying suitable example stylized images from the style examples 206.

In some embodiments, the image manipulation application 204 can select a semantic feature that is representative of the image content in a received input image 202. The image manipulation application 204 uses the semantic feature to search for images in the collection of semantic training images 206 with content that is semantically similar to the input image 202. The image manipulation application 204 identifies at least one semantically similar cluster 208 based on one or more of the semantic training images 206 having content that is semantically similar to the input image 202.

The process 400 also involves selecting one or more image styles associated with the semantically similar cluster 208, as depicted in block 408. For example, the image manipulation application 204 may be executed by a suitable processing device to access ranking data for the example stylized images 210. The ranking data may be accessed from a database or other suitable data structure that is stored on a non-transitory computer-readable medium accessible to the image manipulation application 204. The image manipulation application 204 identifies a portion of the ranking data that identifies rankings of the stylistic similarity between the various example stylized images 210 and the selected cluster. The image manipulation application 102 selects a subset of example stylized images 212 based on the subset of style examples 212 having a style ranking (e.g., a ranking indicative of stylistic similarity) with respect to the selected cluster that is above a threshold ranking.

The process 400 also involves modifying color or contrast information for the input image 202 based on the color or contrast information from one or more selected example stylized images 212, as depicted in block 410. For example, the image manipulation application 204 may be executed by a suitable processing device to execute a style transfer algorithm or other suitable stylization process using the input image 202 and one or more selected example stylized images 212. The style transfer process can identify image statistics with respect to color and tone distributions from a style example and apply the identified statistic or distribution to the input image 202.

Figure 6:
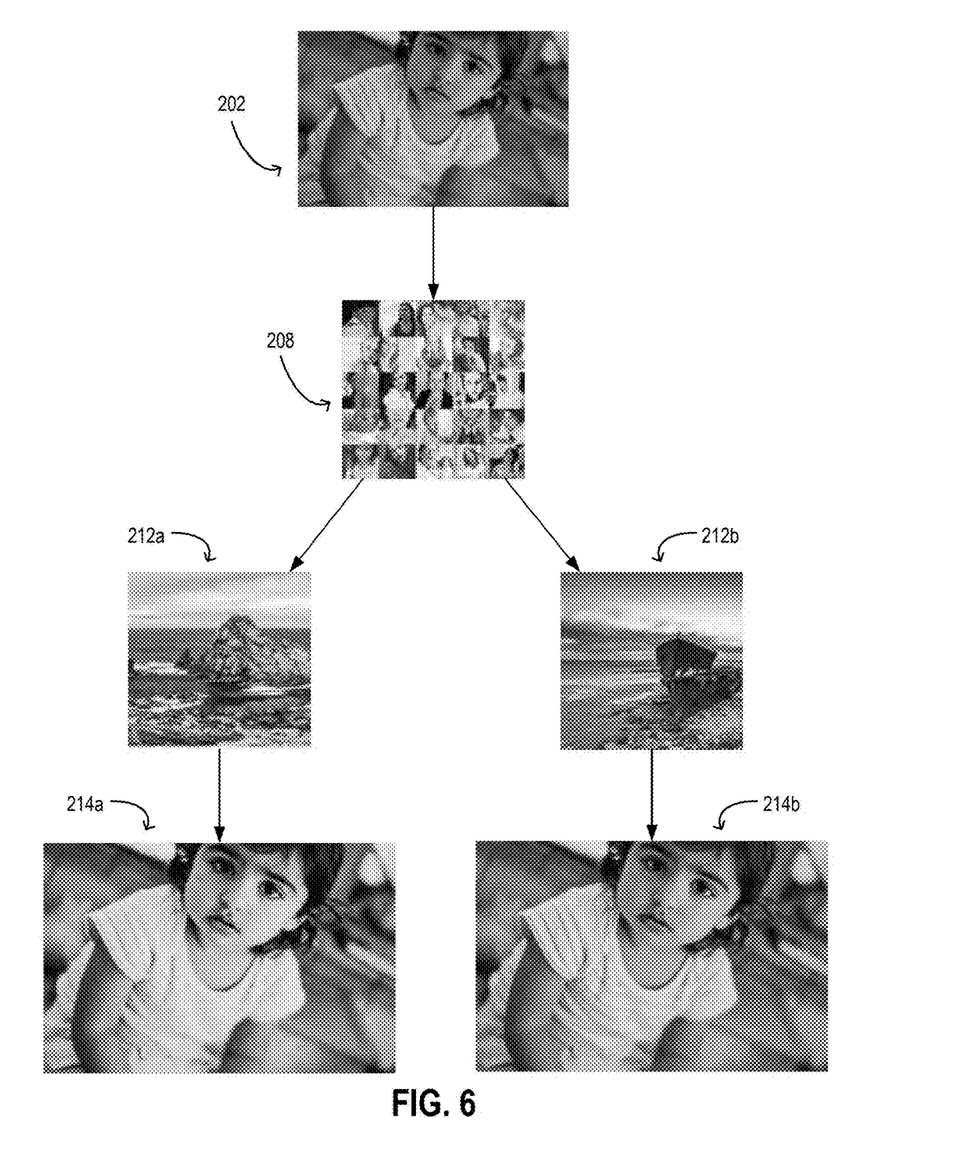
FIG. 6 depicts examples of an input image, a semantically similar cluster used to select example stylized images, selected example stylized images, and resulting stylized output images that are generated using the process depicted in FIG. 4 according to certain exemplary embodiments.

FIG. 6 depicts examples of an input image 202, a semantically similar cluster 208 used to select style examples, the selected style examples 212, and the resulting stylized output images 214a, 214b that are generated using the process 400. The operations executed in block 406 allow for the selection of one or more clusters 208 that are semantically similar to the input image 202. In the example of FIG. 6, the image manipulation application 204 receives an input image 202 depicting a child and selects a cluster 208 including various images depicting people. The operations executed in block 408 allow for the selection of one or more style examples that are appropriate for the content class to which the input image 202 belongs. In the example of FIG. 6, the image manipulation application 204 identifies style examples 212a, 212b that have a sufficiently high stylistic similarity to the selected cluster 208. The operations executed in block 410 allow for the generation of stylized output images using the input image 202 and the selected style examples 212a, 212b. In the example of FIG. 6, the image manipulation application 204 applies the sharply defined green and brown color scheme of the style example 212a to the input image 202 to obtain the output image 214a. The image manipulation application 204 applies the orange-hued color scheme of the style example 212b to the input image 202 to obtain the output image 214b.

Any suitable number of clusters and any suitable number of example stylized images can be selected by the image manipulation application 204. For example, in some embodiments, the image manipulation application 204 extracts a semantic feature of an input image 202. The image manipulation application 204 identifies the most semantically similar cluster 208 from the semantic training images 206. The image manipulation application 204 retrieves the style ranking for this cluster and uses the k style examples having the highest ranking to create a set of k stylized output images 214.

In other embodiments, the image manipulation application 204 performs additional operations to prevent the output images 214 from being too similar to one another. For example, adjacent semantic clusters may include similar high-level semantics and different low-level features (e.g., object scale, object pose, color, tone, etc.). The image manipulation application 204 selects the k clusters that are most semantically similar to the input image 202, selects the highest ranked style example for each of the k clusters, and generates the k output images 214.

In additional or alternative embodiments, the image manipulation application 204 improves image diversity in the output images 214 by comparing the stylistic similarity of different high-ranking example stylized images and discarding example stylized images that are too similar to one another. For example, the image manipulation application 204 may use the Fréchet distance as an additional stylistic similarity metric. The additional stylistic similarity metric $\mathcal{D}_f$ is calculated using the following formula:

$$\mathcal{D}_f(\mathcal{N}_P, \mathcal{N}_Q) = |\mu_P - \mu_Q|^2 + tr[\Sigma_P + \Sigma_Q - 2(\Sigma_P \Sigma_Q)^{1/2}].$$

The Fréchet distance may be used to measure optimal transport between distributions, and is more perceptually linear.

A threshold Fréchet distance controls the diversity between the example stylized images used to generate the output images 214. A smaller threshold may decrease the diversity of the output images 214. A larger threshold may cause lower-ranked example stylized images to be used, which can result in lower quality output images 214 (e.g., output images with larger numbers of artifacts). The image manipulation application 204 can balance the competing goals of high diversity and high quality in the output images 214 by using a first threshold Fréchet distance to select a first set $|\Omega|$ having 3k example stylized images. For example, the image manipulation application 204 can calculate the first threshold Fréchet distance using the following formula:

$$\mathcal{D} = 0.005 + \text{sum}(\Sigma_l^{0.5})/3.$$

$\Sigma_l$ represents the covariance matrix of the luminance channel distribution function for input image 202. The image manipulation application 204 can then select a subset $\hat{\Omega} \in \Omega$, having k example stylized images, where the following cost function is maximized using the following function:

$$\hat{\Omega} = \underset{\Omega}{\text{argmax}} \mathcal{D}_{bs} \mathcal{D}_{ws}^{-1}.$$

$\mathcal{D}_{bs}$ represents the sum of the Fréchet distances for all pairs among the k example stylized images and encourages a smaller degree of stylistic similarity between pairs. $\mathcal{D}_{ws}$ represents the total Fréchet distance from all candidate styles to their nearest style in the set $\Omega$, which causes the selected example stylized images to be maximize the degree of stylistic similarity between the selected example stylized images and as many of the original set of example stylized images as possible.

In one example of an implementation of the process 400, the set of semantic training images 206 is grouped into 1000 clusters. The image manipulation application 204 stores the Caffe semantic feature for the cluster centers in a non-transitory computer-readable medium. The image manipulation application 204 computes the style features and the style rankings for the example stylized images 210 and stores this data in a non-transitory computer-readable medium. To perform style enhancements on particular input images 202, the image manipulation application 204 extracts the Caffe semantic feature for the input image 202. The semantic search, style sampling, and style transfer can use the stored information regarding clustering and ranking. Normalization parameter values of $\lambda_f=0.005$ and $\lambda_c=0.05$ can be used.

Figure 7:
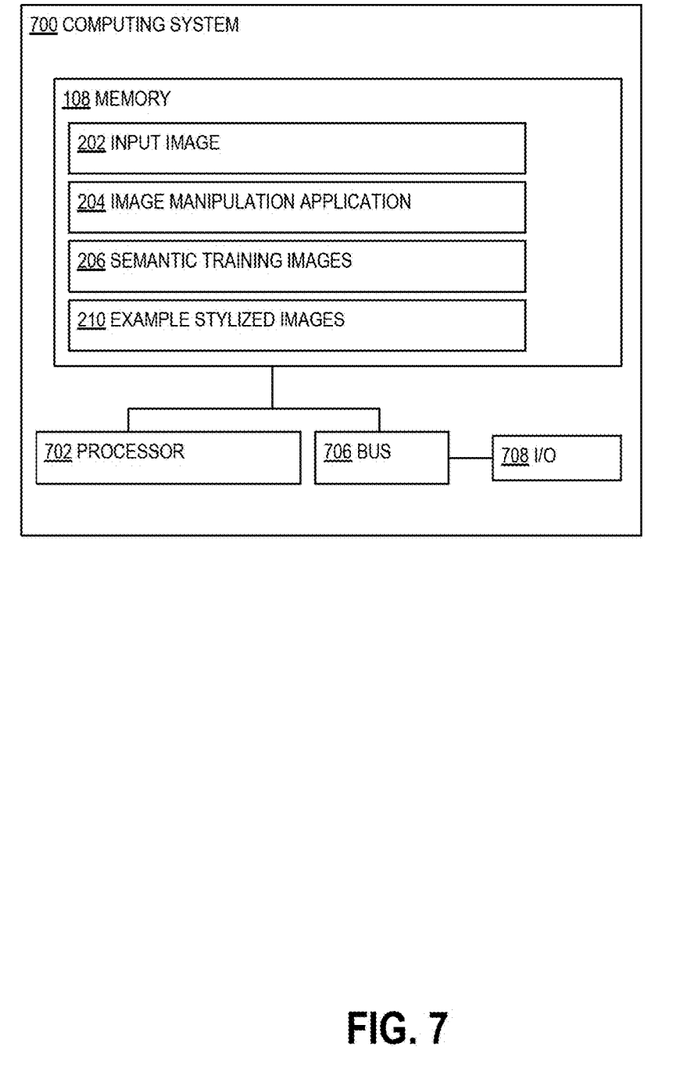
FIG. 7 is a block diagram depicting an example of a computing system that executes an image manipulation application for automatically selecting example stylized images for image stylization operations based on semantic content of an input image according to certain exemplary embodiments.

Any suitable computing system or group of computing systems can be used for selecting style examples for image stylization operations based on semantic content of an input image. FIG. 7 is a block diagram depicting an example of a computing system 700 that executes the image manipulation application 204 for automatically selecting one or more of the style examples 210 for image stylization operations based on the semantic content of an input image 202.

The computing system 700 can include a processor 702 that is communicatively coupled to a memory 704 and that executes computer-executable program code and/or accesses information stored in the memory 704. The processor 702 may comprise a microprocessor, an application-specific integrated circuit ("ASIC"), a field-programmable gate array ("FPGA"), or other processing device. The processor 702 can include any of a number of processing devices, including one. Such a processor can include or may be in communication with a computer-readable medium storing instructions that, when executed by the processor 702, cause the processor to perform the operations described herein.

The memory 704 can include any suitable computer-readable medium. The computer-readable medium can include any electronic, optical, magnetic, or other storage device capable of providing a processor with computer-readable instructions or other program code. Non-limiting examples of a computer-readable medium include a CD-ROM, a DVD, a magnetic disk, a memory chip, a ROM, a RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing system 700 may also comprise a number of external or internal devices such as input or output devices. For example, the computing system 700 is shown with an input/output ("I/O") interface 708 that can receive input from input devices or provide output to output devices. A bus 706 can also be included in the computing system 700. The bus 706 can communicatively couple one or more components of the computing system 700.

The computing system 700 can execute program code that configures the processor 702 to perform one or more of the operations described above with respect to FIGS. 1-6. The program code can include, for example, the image manipulation application 204. The program code may be resident in the memory 704 or any suitable computer-readable medium and may be executed by the processor 702 or any other suitable processor. In some embodiments, the semantic training images 206 and the example stylized images 210 can be resident in the memory 704, as depicted in FIG. 7. In other embodiments, one or more of the semantic training images 206 and the example stylized images 210 can be resident in a memory that is accessible via a data network, such as a memory accessible to a cloud service.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method for automatically selecting and applying an image stylization operation based on semantic content of a received image, the method comprising:
   determining, by a processor, that color information or contrast information of a training image is similar to color information or contrast information of an example stylized image;
   matching, by a processor, the training image to an input image that is semantically similar to the training image;
   selecting, by a processor, the example stylized image based on the example stylized image and the training image having similar color information or contrast information; and
   modifying, by a processor, color information or contrast information of the input image based on the color information or contrast information from the selected example stylized image.

2. The method of claim 1, wherein the example stylized image is selected based on determining that the color information or contrast information of the example stylized image is similar to color information or contrast information of a sufficiently high number of images from a cluster of semantically similar training images that includes the training image.

3. The method of claim 1, wherein determining that the color information or contrast information of training image is similar to the color information or contrast information of an example stylized image comprises:
   grouping a subset of training images from a set of training images into a cluster based on a semantic similarity of shapes and spatial relationships depicted in the grouped training images, wherein the subset of training images includes the training image;
   comparing the color information or contrast information of the example stylized image to color information or contrast information of each training image in the subset of training images; and
   determining that a sufficiently large number of training images in the subset of training images has color information or contrast information that is similar to the color information or contrast information of the example stylized image.

4. The method of claim 1, wherein the color information comprises a distribution of colors and the contrast information comprises at least one of global contrast, local contrast, lighting direction, and vignetting.

5. The method of claim 1, wherein determining that the training image and the example stylized image have similar color information or contrast information comprises determining a style ranking for the example stylized image with respect to a cluster of semantically similar training images that include the training image, wherein the style ranking is determined based on (i) respective Gaussian statistics for respective chrominance channels of the example stylized image and the training images in the cluster and (ii) respective Euclidean distances between a vector representing a luminance channel of the example stylized image and respective additional vectors representing additional luminance channels of the training images in the cluster.

6. The method of claim 1, wherein determining that the training image and the example stylized image have similar color information or contrast information comprises determining a style ranking for the example stylized image with respect to a cluster of semantically similar training images that include the training image, wherein determining the style ranking comprises:
   determining stylistic similarity metrics for the example stylized image with respect to the training images in the cluster, wherein determining each stylistic similarity metric for a respective training image comprises:
      determining first Gaussian statistics for a first chrominance channel of the example stylized image and second Gaussian statistics for a second chrominance channel of the respective training image,
      calculating a respective Hellinger distance based on the first Gaussian statistics and the second Gaussian statistics,
      determining a first luminance vector representing a first luminance channel of the example stylized image and a second luminance vector representing a second luminance channel of the respective training image, and
      calculating a respective Euclidean distance based on the first luminance vector and the second luminance vector,
      wherein the stylistic similarity metric is determined from the respective Hellinger distance and the respective Euclidean distance; and
   determining the style ranking by aggregating the stylistic similarity metrics.

7. The method of claim 1, wherein the method further comprises:
   selecting sufficiently diverse example stylized images for stylizing the input image, wherein selecting the sufficiently diverse example stylized images comprises:
      selecting a plurality of example stylized images that have sufficiently high style rankings with respect to a cluster of semantically similar training images that include the training image,
      determining that a first example stylized image and a second example stylized image from the plurality of example stylized images have an excessive stylistic similarity with respect to one another, and
      selecting a subset of example stylized images from the plurality of example stylized images that excludes at least one of the first example stylized image and the second example stylized image; and
   modifying color information or contrast information of the input image based on color information or contrast information of the selected subset of example stylized images.

8. The method of claim 7, wherein the excessive stylistic similarity is determined based on first Gaussian statistics for a first chrominance channel of the first example stylized image and second Gaussian statistics for a second chrominance channel of the first example stylized image.

9. The method of claim 1, further comprising:
   grouping subsets of training images from a set of training images into clusters, wherein each subset of training images is grouped into a respective cluster on a semantic similarity of shapes and spatial relationships depicted in the grouped training images, wherein a similarity of color information or contrast information of the training image and the example stylized image is determined based on a sufficiently large number of training images in a first cluster that includes the training image having color information or contrast information that is similar to color information or contrast information of the example image;

determining that a sufficiently large number of training images in a second cluster that includes an additional training image have color information or contrast information that is similar to color information or contrast information of an additional example stylized image;

matching the additional training image from the second cluster to the input image based on the additional training image being semantically similar to the input image;

selecting the additional example stylized image based on (i) the additional example stylized image and the additional training image having similar color information or contrast information and (ii) the example stylized image and the additional example stylized image having sufficiently different color information or contrast information modifying color information or contrast information of the input image based on color information or contrast information from the additional example stylized image.

10. The method of claim 9, wherein the subsets of training images are grouped into the clusters prior to receiving the input image.

11. The method of claim 1, further comprising at least one of:
selecting the example stylized image based on a prior user input indicating a preference for the example stylized image; and
excluding an additional example stylized image having color information or contrast information similar to the color information or contrast information of the training image based on a prior user input indicating a rejection of the additional example stylized image.

12. A system comprising:
a processing device; and
a non-transitory computer-readable medium communicatively coupled to the processing device,
wherein the processing device is configured for executing instructions stored in the non-transitory computer-readable medium and thereby performing operations comprising:
determining that color information or contrast information of a training image is similar to color information or contrast information of an example stylized image,
matching the training image to an input image that is semantically similar to the training image,
selecting the example stylized image based on the example stylized image and the training image having similar color information or contrast information, and
modifying color information or contrast information of the input image based on the color information or contrast information from the selected example stylized image.

13. The system of claim 12, wherein determining that the color information or contrast information of training image is similar to the color information or contrast information of an example stylized image comprises:
grouping a subset of training images from a set of training images into a cluster based on a semantic similarity of shapes and spatial relationships depicted in the grouped training images, wherein the subset of training images includes the training image;
comparing the color information or contrast information of the example stylized image to color information or contrast information of each training image in the subset of training images; and
determining that a sufficiently large number of training images in the subset of training images has color information or contrast information that is similar to the color information or contrast information of the example stylized image.

14. The system of claim 12, wherein determining that the training image and the example stylized image have similar color information or contrast information comprises determining a style ranking for the example stylized image with respect to a cluster of semantically similar training images that include the training image, wherein the style ranking is determined based on (i) respective Gaussian statistics for respective chrominance channels of the example stylized image and the training images in the cluster and (ii) respective Euclidean distances between a vector representing a luminance channel of the example stylized image and respective additional vectors representing additional luminance channels of the training images in the cluster.

15. The system of claim 12, wherein determining that the training image and the example stylized image have similar color information or contrast information comprises determining a style ranking for the example stylized image with respect to a cluster of semantically similar training images that include the training image, wherein determining the style ranking comprises:
determining stylistic similarity metrics for the example stylized image with respect to the training images in the cluster, wherein determining each stylistic similarity metric for a respective training image comprises:
determining first Gaussian statistics for a first chrominance channel of the example stylized image and second Gaussian statistics for a second chrominance channel of the respective training image,
calculating a respective Hellinger distance based on the first Gaussian statistics and the second Gaussian statistics,
determining a first luminance vector representing a first luminance channel of the example stylized image and a second luminance vector representing a second luminance channel of the respective training image, and
calculating a respective Euclidean distance based on the first luminance vector and the second luminance vector,
wherein the stylistic similarity metric is determined from the respective Hellinger distance and the respective Euclidean distance; and
determining the style ranking by aggregating the stylistic similarity metrics.

16. The system of claim 12, wherein the operations further comprise:
selecting sufficiently diverse example stylized images for stylizing the input image, wherein selecting the sufficiently diverse example stylized images comprises:
selecting a plurality of example stylized images that have sufficiently high style rankings with respect to a cluster of semantically similar training images that include the training image,
determining that a first example stylized image and a second example stylized image from the plurality of example stylized images have an excessive stylistic similarity with respect to one another, and selecting a subset of example stylized images from the plurality of example stylized images that excludes at least one of the first example stylized image and the second example stylized image; and modifying color information or contrast information of the input image based on color information or contrast information of the selected subset of example stylized images.

17. A non-transitory computer-readable medium having program code executable by a processing device stored thereon, the program code comprising:

program code for determining that color information or contrast information of a training image is similar to color information or contrast information of an example stylized image;

program code for matching the training image to an input image that is semantically similar to the training image;

program code for selecting the example stylized image based on the example stylized image and the training image having similar color information or contrast information; and program code for modifying color information or contrast information of the input image based on the color information or contrast information from the selected example stylized image.

18. The non-transitory computer-readable medium of claim 17, wherein the example stylized image is selected based on determining that the color information or contrast information of the example stylized image is similar to color information or contrast information of a sufficiently high number of images from a cluster of semantically similar training images that includes the training image.

19. The non-transitory computer-readable medium of claim 17, further comprising program code for grouping subsets of training images from a set of training images into clusters, wherein each subset of training images is grouped into a respective cluster on a semantic similarity of shapes and spatial relationships depicted in the grouped training images, wherein a similarity of color information or contrast information of the training image and the example stylized image is determined based on a sufficiently large number of training images in a first cluster that includes the training image having color information or contrast information that is similar to color information or contrast information of the example image;

program code for determining that a sufficiently large number of training images in a second cluster that includes an additional training image have color information or contrast information that is similar to color information or contrast information of an additional example stylized image;

program code for matching the additional training image from the second cluster to the input image based on the additional training image being semantically similar to the input image;

program code for selecting the additional example stylized image based on (i) the additional example stylized image and the additional training image having similar color information or contrast information and (ii) the example stylized image and the additional example stylized image having sufficiently different color information or contrast information program code for modifying color information or contrast information of the input image based on color information or contrast information from the additional example stylized image.

20. The non-transitory computer-readable medium of claim 17, further comprising at least one of:

program code for selecting the example stylized image based on a prior user input indicating a preference for the example stylized image; and program code for excluding an additional example stylized image having color information or contrast information similar to the color information or contrast information of the training image based on a prior user input indicating a rejection of the additional example stylized image.

* * * * *